United States Patent [19]

Beckmann et al.

[11] 4,451,889
[45] May 29, 1984

[54] ANTI-LOCK DEVICE FOR REGULATING THE BRAKE PRESSURE OF VEHICLE BRAKES

[75] Inventors: Heinrich Beckmann; Jens Ottersbach, both of Minden; Willibald Roider, Neufahrn; Eckart Saumweber, Gauting, all of Fed. Rep. of Germany

[73] Assignee: Knorr-Bremse GmbH, Munich, Fed. Rep. of Germany

[21] Appl. No.: 306,887

[22] Filed: Sep. 30, 1981

[30] Foreign Application Priority Data

Oct. 20, 1980 [DE] Fed. Rep. of Germany ....... 3039574
Feb. 11, 1981 [DE] Fed. Rep. of Germany ....... 3104876

[51] Int. Cl.³ .............................................. B60T 8/02
[52] U.S. Cl. ..................................... 364/426; 303/95
[58] Field of Search .......................... 303/96, 97, 105; 364/426

[56] References Cited

U.S. PATENT DOCUMENTS 3,235,036 2/1966 Meyer et al. ................... 303/104
3,508,795 4/1970 Scharlack et al. ............... 303/104
4,260,199 4/1981 Reinecke .......................... 303/96

Primary Examiner—B. Dobeck
Assistant Examiner—Saul M. Bergmann
Attorney, Agent, or Firm—Edmund M. Jaskiewicz

[57] ABSTRACT

An anti-lock device for the brakes of vehicles, particularly rail vehicles, regulates the applied braking force. An evaluation circuit monitors the speed, acceleration and slip of at least one braked wheel and in response to the rotational behavior of the wheel generates instructions for the brake actuating element. The evaluation circuit maintains the brake pressure constant during the initial phase upon the first application of brakes until the wheel acceleration falls below a predetermined negative threshold value. The initial phase is terminated when the wheel acceleration falls below a further predetermined reference value which is lower than the first threshold value. Upon termination of the initial phase, the brake pressure is again varied in a manner as known in the art.

5 Claims, 6 Drawing Figures

- MAINTAIN PRESSURE
↓ REDUCE PRESSURE RAPIDLY
↳ REDUCE PRESSURE PULSE-WISE
↑ INCREASE PRESSURE RAPIDLY

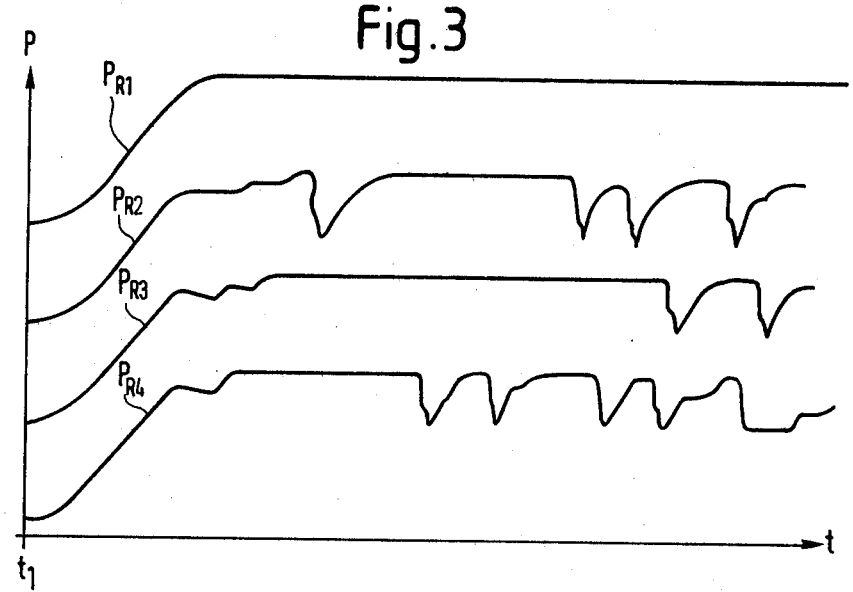
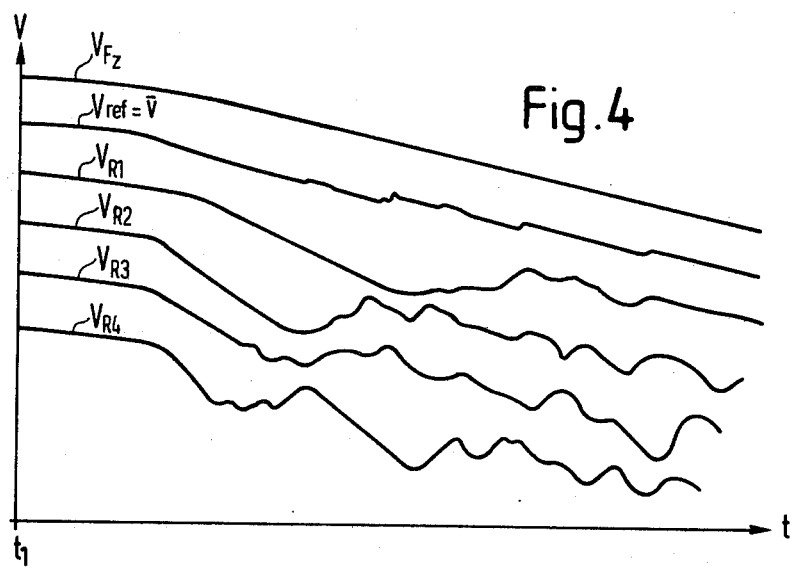

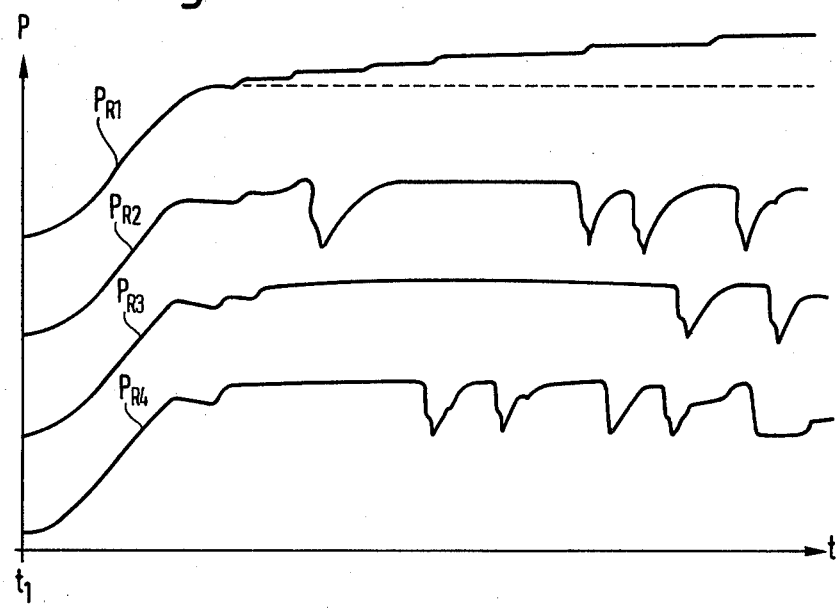
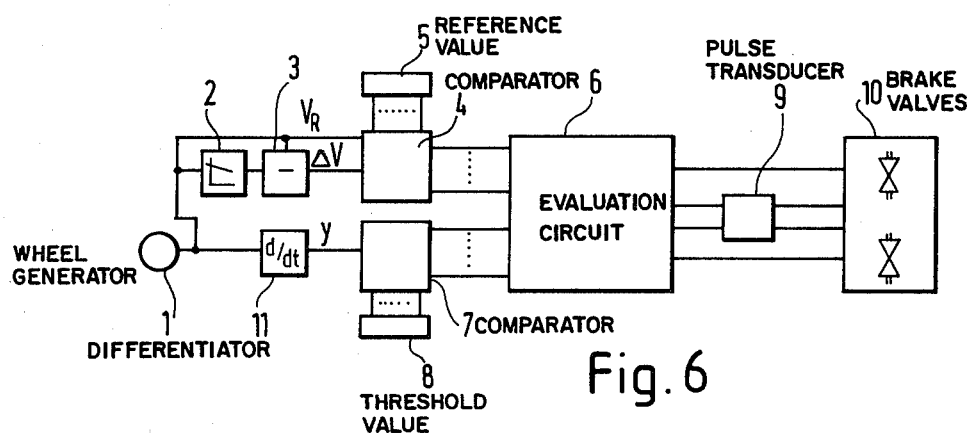

ANTI-LOCK DEVICE FOR REGULATING THE BRAKE PRESSURE OF VEHICLE BRAKES

The present invention relates to an anti-lock device for rail and other vehicles, more particularly, to such a device which regulates the braking force.

It is known generally to provide a device for the regulation of braking force of vehicles and particularly rail vehicles in order to prevent locking or slipping of the wheels. Such a device may comprise at least one wheel generator connected to a monitored wheel on the vehicle and generating a signal indicative or proportional to the rotational speed of the wheel. A reference value source generates a reference value signal responsive to the speed of the vehicle. There is a differentiator which produces signals proportional to the acceleration or deceleration of the wheel, and threshold value circuits which compare the wheel acceleration signals, the wheel speed signals and/or difference signals between wheel speed signals and reference signals with predetermined threshold values. An evaluation circuit then operates in response to the threshold value circuits to reduce or increase the brake pressure rapidly or slowly by stages in response to the output signals of the threshold value circuit. Such braking force regulating circuits have been provided by the assignee of the subject application under the designation GR 3. The criteria for reduction of brake pressure may include predetermined threshold values of the wheel deceleration (b-criterion) or a threshold value or values of the wheel slip (V-criteria) which may be superposed on the wheel deceleration. The individual predetermined threshold values may be modified or the manner in which they exert an influence on the braking pressure may be carried out in response to the absolute wheel speed.

When the wheel deceleration criterion is used, the controlled brake pressure is continuously reduced after a first (negative) threshold value of the wheel acceleration is exceeded. "Wheel acceleration" is used herein in the mathematically strict sense such that negative wheel acceleration means wheel deceleration.

The first attained threshold value thus had to be relatively small in magnitude so that impending locking of the wheel could be detected as soon as possible. As a result, the monitored wheel was not driven sufficiently far "into slip" so as to achieve the maximum possible adhesion value between the wheel and the rail. However, such a prior art arrangement did provide a stopping distance or braking path in which any locking of the wheel was indeed prevented with a high degree of probability. Thus, on the one hand locking of the wheel during braking was effectively prevented but on the other hand the stopping distance during application of the brakes or braking path remained substantially unchanged from the situation where there was no locking whatsoever of the wheels.

It is therefore the principal object of the present invention to provide a system for regulating braking force so as to prevent the vehicle wheels from locking.

It is another object of the present invention to provide such a system which protects the wheels against locking but at the same time shortens the braking path.

It is a further object of the present invention to provide such a braking force regulation system which effectively prevents locking of the wheel during braking but maintains a maximum degree of adhesion of the wheel to the surface during the braking operation.

The present invention provides for achieving these objects by providing a braking system in which during the start or initial phase of a braking operation the brake pressure is maintained constant upon the wheel acceleration decreasing below a first negative acceleration threshold. The start or initial phase begins with the first application of braking which generally occurs after the vehicle has been travelling for a period of time at a relatively constant speed.

According to one aspect of the present invention an antilock device for vehicle brakes may comprise a means connected to a wheel of a vehicle to generate a signal indicative of the wheel's speed and further means for generating a reference signal indicative of the vehicle speed. Differentiation is used to generate a proportional signal being proportional to either the wheel acceleration or deceleration. The wheel's speed signals, the reference signals and the proportional signals are then compared with predetermined threshold values and the output of this comparison is supplied to an evaluation circuit which maintains the brake pressure constant during an initial phase of the braking operation until the wheel acceleration falls below a first negative acceleration threshold.

The start phase is terminated when the wheel acceleration falls below a lower negative threshold value. The applied braking pressure is then rapidly lowered as known in the art either in stages or gradually.

According to the present state of the art, the initial measure to protect against locking of the wheels during braking invariably consisted of reducing the applied braking pressure. However, in the present invention it is deliberately accepted that the monitored wheel will slip to a relatively large degree with the result that the present invention more effectively utilizes the maximum possible adhesion between the wheel and the rail. Further according to the present invention a still greater degree of slip is accepted by increasing the applied braking pressure during the start phase so as to still more effectively utilize the adhesion forces available between the wheel and the rail. The present invention additionally provides for a smooth regulation of the wheel by the individual control cycles consisting of maintaining brake pressure constant, reducing the brake pressure and then increasing the brake pressure which cycles occur less often than in a controlled system in which the brake pressure is reduced immediately at the beginning of a controlled cycle during a braking operation.

Other objects and advantages of the present invention will be apparent upon reference to the accompanying description when taken in conjunction with the following drawings, which are exemplary, wherein:

FIG. 3 is a graph showing the applications of braking force on each axle of a four-axle vehicle;

FIG. 4 is a chart based upon FIG. 3 and showing the wheel speeds of the wheel of the four-axle vehicle;

FIG. 5 is a graph similar to that of FIG. 3 but showing increases of brake pressure in the starting phase for the first axle; and FIG. 6 is a schematic electrical circuit block diagram of the brake pressure regulating circuit according to the present invention.

Proceeding next to the drawings wherein like reference symbols indicate the same parts throughout the various views a specific embodiment and modifications of the present invention will be described in detail.

Figure 1:
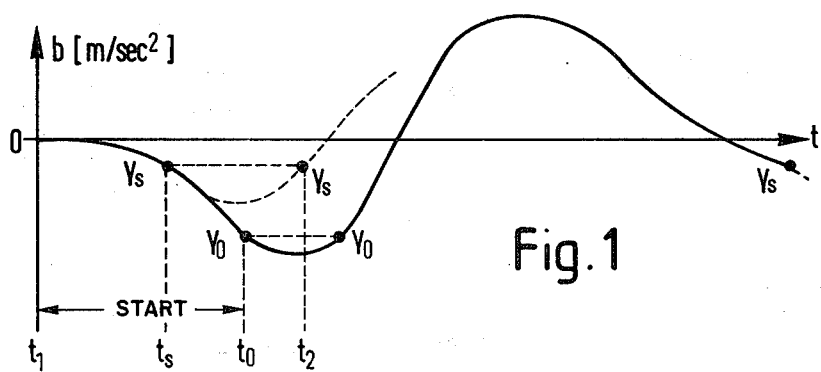
FIG. 1 is a graph showing the magnitude of wheel acceleration against time during a braking operation.

In FIG. 1, there is illustrated schematically the magnitude of wheel acceleration with respect to time during a braking process. The magnitudes $Y_s$ and $Y_O$ indicate individually set predetermined threshold values for the negative acceleration or deceleration of the wheel.

The "start phase" begins upon the initial application of the brakes ($t_1$ in FIG. 1) after unbraked travel of the vehicle and terminates when the wheel acceleration has fallen below the quantitatively relatively large (negative) value $Y_O$ at $t_O$. The actual shape of the curve of FIG. 1 depends upon the individual braking parameters which would include the surface conditions of the wheel and rail, adhesion values, applied braking forces and the like which are generally known in the art. Thus, the solid line curve in FIG. 1 exists for a given set of parameters and curves for other sets of parameters would vary somewhat from the curve illustrated. Since the present invention relates only to the "start phase" of the braking operation, detailed consideration of further threshold values as known in the art and as discussed above is not necessary.

Figure 2:
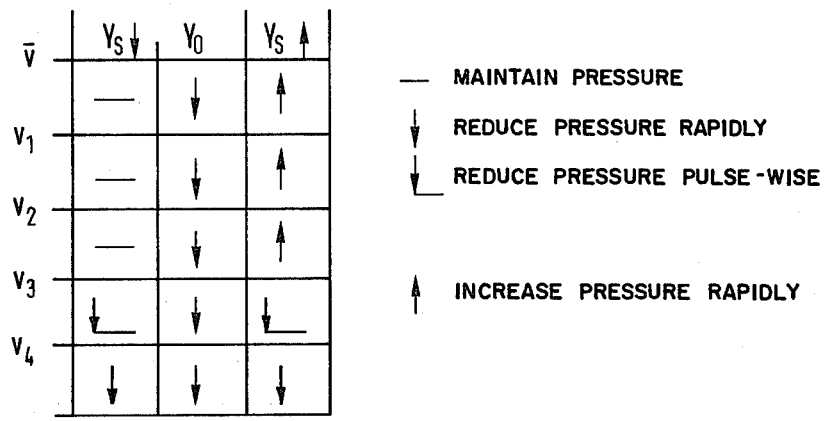
FIG. 2 is a chart showing various applications of braking pressure at different speed conditions.

FIG. 2 illustrates the measures adopted to regulate the brake pressure in response to particular criteria which trigger or release these measures. Five speed ranges are established based upon a reference speed $\bar{v}$ which is indicative or simulates the actual speed of the vehicle and by predetermined threshold values $v_1$–$v_4$ of the wheel speed. The term "wheel speed" more accurately refers to the rotary speed of the wheel and this speed decreases from the top to the bottom of the chart of FIG. 2. The vertical columns $Y_s \downarrow$ or $Y_s \uparrow$ refers to the conditions in which the actual wheel's acceleration falls below the initial threshold $Y_s$ from a greater value or this threshold $Y_s$ is exceeded by a subsequent increase in the wheel acceleration as indicated by the dashed lines in FIG. 1.

With reference to FIG. 1, a braking operation begins by the application of a braking pressure at the time $t_1$. This application of braking pressure decelerates the wheel or wheels to which the braking pressure is applied. The braking pressure is increased for a period of time until the wheel acceleration has decreased to the threshold value $Y_s$ at the time $T_s$. If, at the time $T_s$ the wheel speed is in one of the first three speed ranges of $\bar{v}$–$v_3$, the brake pressure being applied at this time is maintained. This can be achieved, for example, by closing the inlet valve with the outlet valve already closed.

As illustrated by the curve $P_{R1}$ of FIG. 3, the phase of maintaining braking pressure constant may exist for a relatively long time and possibly even throughout the entire braking process.

If this maintained braking pressure is of such a magnitude that the wheel acceleration again exceeds the threshold value $Y_s$ in FIG. 1 in the direction from a small value to a larger value, the brake pressure will be further increased at the time of $t_2$. This condition is still within the "start phase" of the braking operation since the wheel acceleration has not yet reached the second threshold value $Y_O$. This increase in brake pressure will be applied for a duration of time until the wheel acceleration, again, falls below the initial threshold value $Y_S$. If this maintained braking pressure is too great for the continuing braking operation, for example, should the adhesion value between the wheel and the rail deteriorate, the following situations could occur:

(a) The wheel acceleration continues to decrease and falls below the second threshold value $Y_O$. This threshold value is selected to be of a relatively large magnitude, so that when this second threshold value is exceeded, there is an acute danger of locking of the brakes. In this event, the existing braking pressure is rapidly reduced, such as by completely opening the inlet valve. The "start phase" is thus terminated and further control of the braking continues, using regulation criteria which are not the subject of the present invention.

(b) The wheel acceleration does not decrease to reach the threshold value $Y_O$, but the speed difference $\Delta v$ between the vehicle reference speed and the wheel speed increases to such an extent that the corresponding wheel rotates very slowly and similarly is about to lock. Should the wheel speed now fall within the speed range of $v_3$–$v_4$, the brake pressure is slowly reduced by pulse-actuation of the outlet valve or "pulsing". Should the wheel speed be smaller than $v_4$ so that $\Delta v$ is thus relatively greater, the brake pressure is then rapidly reduced.

Various measurement values obtained in actual practice for a four-axle rail vehicle are illustrated in FIGS. 3, 4 and 5. Index I indicates the front axle of the forward bogie, Index II, the rear axle of the forward bogie; Index III, the front axle of the rear bogie; and Index IV, the rear axle of the rear bogie. The curve $V_{Fz}$ shown in FIG. 4 indicates the actual speed of the vehicle which would be generally sensed by an unbraked measuring wheel. Curve $\bar{v}$ indicates the so-called imaginary or hypothetical speed which conventionally represents the simulation of the vehicle speed, but which cannot be obtained in the usual vehicles by measuring the speed of any wheel since all wheels may be in a slip condition. It is therefore common practice to use a simulated vehicle speed which is used as a reference speed.

For purposes of clarity, the individual curves are illustrated in displaced positions in FIGS. 3, 4 and 5. In actuality, the respective initial points of each of the curves would start from a common point so that the curves of each graph would be superimposed upon each other. However, the time scales of FIGS. 3, 4 and 5 do coincide.

With particular emphasis on the characteristics and properties of the first axle during the braking operation according to the present invention, it is to be noted that the braking pressure is maintained constant during the entire braking process after the initial increase upon application of the brakes as shown in FIG. 3. The associated axle speed $V_{R1}$ nevertheless shows fluctuation which most likely exists because of varying adhesion between the wheel and the rail. However, these changes in wheel and axle speed are not of such a great magnitude that one of the above-mentioned criteria for a variation of brake pressure is reached.

Particular notice is also directed to the course of the first wheel or axle, as illustrated in FIG. 5, wherein the wheel is in the "start phase" throughout the braking operation. The dash line in FIG. 5 for axle No. 1 illustrates the brake pressure at which the value decreases for the first time below the initial threshold value $Y_S$. In the individual stages, the actual value of wheel acceleration fell below the threshold value $Y_S$ (braking pressure maintained constant) or return above the initial threshold value (braking pressure increased). The other axles and wheels, on the contrary, show more or less significant drops in speed and the corresponding countermeasures. It is to be noted that the third axle also shows a relatively long, stable period, wherein changes of braking pressure are not necessary.

In the schematic block diagram of FIG. 6, a wheel generator is mechanically coupled to the corresponding wheel and emits a coded signal proportional to the rotary speed of the wheel. In wheel generators which are generally used, at the present time, a pulse-type signal is emitted, having a frequency proportional to the rotary speed of the wheel. This "wheel speed signal" is supplied to a conventional capacitor discharge circuit which generates the signal $\bar{v}$. The signal $\bar{v}$ is supplied together with the wheel speed signal $v_R$ to a comparator 3 which emits a speed different signal $\Delta v$ corresponding to the difference between the input signals. The signals $v_R$ and $\Delta v$ are then supplied to a comparator 4 and compared with the signals from a reference value source 5. The reference value source 5 supplies the threshold values for the above-mentioned speed ranges $v_1$–$v_4$. The outputs of the comparator 4 carries signals which indicate the corresponding speed range or the $\Delta v$ criteria as described above. The outputs of comparator 4 are supplied to an evaluation circuit 6.

The wheel speed signal from the wheel generator 1 is also supplied to a differentiating circuit 11 at the output of which appears a signal proportional to wheel acceleration (See FIG. 1). This signal is then compared in a further comparator 7 with the acceleration threshold values $Y_S$ and $Y_O$ supplied from a threshold value source 8. In response to the comparison carried out in comparator 7, corresponding signals are supplied at the output leads of the comparator 7 and show which, if any, of the acceleration criteria are achieved. These signals are similarly supplied to the evaluation circuit 6.

The evaluation circuit 6 then carries out the logical operations illustrated in the table of FIG. 2 and supplies at its outputs corresponding signals for control of brake valves 10. A pulse transducer 9 controls the pulse-type actuation of the brake-valves 10 for a slow pressure increase or decrease.

The individual components of the evaluation circuit 6 can be readily determinated by one skilled in the art on the basis of the chart of FIG. 2 so that a detailed description of the evaluation circuit is not necessary to the disclosure and understanding of the present invention.

It is therefor apparent that the present invention provides a braking course regulation system which not only protects against locking of the wheels during braking, but significantly shortens the braking path of the vehicle. This result is achieved by maintaining the braking pressure constant or increased even further after a first (negative) acceleration threshold of the wheels is reached, which is in contrast to the present state of the art where at this threshold the braking pressure is decreased. The monitored wheel is thus permitted to achieve relatively large slip values which in turn leads to a more effective utilization of the adhesion value between the wheel and the rail. While the precise physical processes occuring between the wheel and the rail as a result of wheel slip are not fully known, it is generally believed that relatively high slip produces a roughening or "cleaning" of the rail and/or the running of the wheels, which results in a further increase of the adhesion value.

It will be understood that this invention is susceptible to modifications to adapt it to different usages and conditions and, accordingly, it is desired to comprehend such modifications within this invention as may fall within the scope of the appended claims.

What is claimed is:

1. An anti-lock device for vehicle brakes comprising means connected to a wheel of a vehicle for generating a signal indicative of the wheel speed, means for generating a reference signal indicative of the speed of the vehicle, differentiating means for generating a proportional signal being proportional to one of the acceleration and deceleration of the wheel, comparator means for comparing the wheel speed signals, the reference signals and the proportional signals with predetermined threshold values and having an output, and an evaluation circuit connected to the output of said comparator means to maintain the brake pressure constant during a start phase of the braking operation after the wheel acceleration falls below a first negative acceleration threshold.

2. An anti-lock device as claimed in claim 1 wherein said evaluation circuit increases the brake pressure in the event that the first negative threshold is again exceeded by the wheel acceleration from a direction of a greater negative value.

3. An anti-lock device as claimed in claim 1 where there is a second negative threshold value greater than said first threshold value to define the end of the initial phase of the braking operation, said evaluation circuit rapidly decreasing the brake pressure when the wheel acceleration falls below said second threshold value.

4. An anti-lock device is claimed in claim 1 wherein during said initial phase said evaluation circuit changes from a state of maintaining the brake pressure constant to a state of slowly reducing the brake pressure when the wheel speed falls below a first predetermined reference value.

5. An anti-lock device as claimed in claim 4 wherein during said initial phase said evaluation circuit changes from a state of one of maintaining the brake pressure constant and slowly reducing the brake pressure to a state of rapidly reducing the brake pressure when the wheel speed falls below a second predetermined reference value lower than said first reference value.

* * * * *